UNITED STATES PATENT OFFICE.

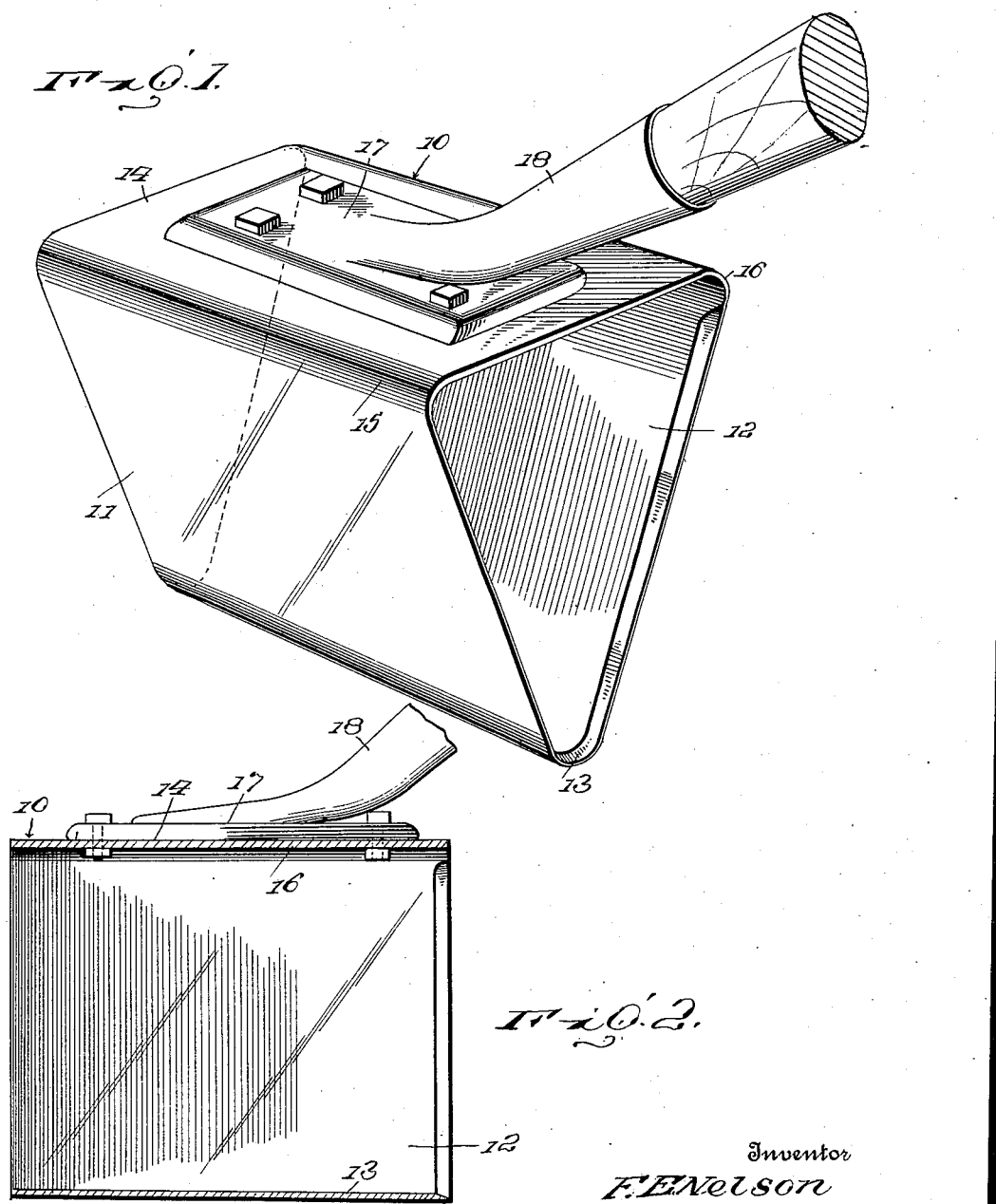

FRANK E. NELSON, OF JAMESTOWN, NEW YORK.

LAWN-TRIMMER.

1,018,073.  Specification of Letters Patent. Patented Feb. 20, 1912.

Application filed November 14, 1910. Serial No. 592,377.

*To all whom it may concern:*

Be it known that I, FRANK E. NELSON, citizen of the United States, residing at Jamestown, in the county of Chautauqua and State of New York, have invented certain new and useful Improvements in Lawn-Trimmers, of which the following is a specification.

This invention relates to improvements in implements for trimming lawns at the edges of walks, and more particularly to implements of this class operated by hand, and has for one of its objects to improve the construction and increase the efficiency of devices of this character.

Another object of the invention is to provide a simple construction and implement of this character whereby the channel or cut may be readily formed with symmetrical sides and continuous uniform bottom and without irregularities.

Another object of the invention is to provide a trimming implement wherein provision is made for reducing the friction and likewise to compress the material as it is severed to facilitate its removal.

With these and other objects in view that will more fully appear as the description proceeds, the invention consists in certain constructions and arrangements of the parts that I shall hereinafter fully describe and then point out the novel features of in the appended claim.

For a full understanding of the invention and the merits thereof and also to acquire a knowledge of the details of construction, reference is to be had to the following description and accompanying drawing, in which:

Figure 1 is a perspective view of the improved implement; and, Fig. 2 is a longitudinal sectional view.

Corresponding and like parts are referred to in the following description and indicated in all the views of the drawings by the same reference characters.

The improved implement comprises a body or tubular portion and an operating handle, the tubular portion being represented as a whole at 10 and is formed from sheet metal, preferably steel, with the edges preferably welded or otherwise suitably connected so that the walls of the tubular member are symmetrical throughout and without projections internally or externally. The body 10 is formed with its sides diverging upwardly as represented at 11—12 and with the bottom portion curved, as shown at 13 and with the walls also slightly converging toward the rear, the object to be hereafter explained. This arrangement leaves the top portion 14 flat, and rounded at the juncture of the flat top and the diverging sides, as shown at 15—16. At its ends the tubular structure is at right angles to the longitudinal axis of the same, as shown in Fig. 2. At its forward end the edges of the sides 11—12 and the body 13 are sharpened, as these portions of the tubular member constitute the cutting edges of the implement. A handle is connected to the flat top 14 and the tubular member and is formed with a base 17 riveted or otherwise suitably secured thereto and provided with a socket 18 to receive a handle 19, the latter preferably of wood of any suitable length and size. The tubular member may be of any required size, but will preferably be about $3\frac{1}{2}$ inches wide at the widest portion, $3\frac{1}{2}$ inches long, and about 4 inches high, but it will be understood that these dimensions may be varied as required, the dimensions given being for an ordinary hand operated implement. With a device thus constructed when a lawn next to a walk is to be trimmed, the implement is drawn through the ground with downward pressure applied to the forward end to cause it to cut into the soil, and as the implement is drawn forward the relatively long arrangement of the side walls of the tubular member causes the implement to operate symmetrically and steadily and, therefore, avoid the formation of irregularities in the bottom of the channel without any particular effort on the part of the operator. By this arrangement it will also be obvious that as the implement is drawn through the ground the slightly reduced size of the rear whereby the correspondingly slightly converging side walls are produced reduces the friction against the soil outside the implement, while at the same time slightly compressing the soil as it moves through the body and thus produces a relatively compact ribbon of soil so that its removal is facilitated. This is an important feature of applicant's device and materially increases its efficiency and utility. As the implement is drawn forward the soil is loosened and may be lifted from the channel and disposed of in any desired manner, and the implement again applied and again filled with the soil, and so on continuously.

If preferred the implement may be moved forward continuously and cause the earth to pass through the implement in a continuous stream and left loose in the channel from which it may be removed by any suitable implement. The improved implement is simple in construction, can be inexpensively manufactured and of any required size.

Having thus described the invention, what is claimed as new is:

A trimming implement comprising a body continuous in transverse section and formed with diverging side portions and a flat top, the forward and rear edges of the body being at the same distance from each other throughout their lengths, the top and side portions of the body converging inwardly toward each other at one end of the body, and a base fixed to the top portion of the body and having a handle socket.

In testimony whereof, I affix my signature in presence of two witnesses.

FRANK E. NELSON. [L. S.]

Witnesses:
 AXEL H. ANDERSSON,
 OSCAR NARIN.

---

Copies of this patent may be obtained for five cents each, by addressing the "Commissioner of Patents, Washington, D. C."